United States Patent [19]

Mulla et al.

[11] 3,846,557
[45] Nov. 5, 1974

[54] BAIT FOR SYNANTHROPIC FLIES AND METHOD FOR MAKING SAME

[75] Inventors: Mir S. Mulla; Yih-Shen Hwang, both of Riverside, Calif.

[73] Assignee: The Regents of the University of California, Berkeley, Calif.

[22] Filed: May 26, 1972

[21] Appl. No.: 257,315

[52] U.S. Cl. .................................. 426/1, 426/385
[51] Int. Cl. .............................................. A01n 1/02
[58] Field of Search .......... 99/3, 192, 199 R, 9, 2 R, 99/14, 18, 17; 424/84; 426/1, 384, 385; 34/5; 43/131, 129

[56] References Cited
UNITED STATES PATENTS

| | | | |
|---|---|---|---|
| 1,059,888 | 4/1913 | Maire | 424/84 X |
| 1,168,552 | 1/1916 | Richards | 99/3 |
| 1,185,894 | 6/1916 | Evans | 99/3 |
| 1,392,253 | 3/1921 | Gamble | 426/1 |
| 1,979,124 | 10/1934 | Tival | 99/199 X |
| 2,452,552 | 11/1948 | Curtis et al. | 99/3 |
| 3,097,128 | 7/1963 | Sprinkle | 424/84 X |
| 3,251,398 | 5/1966 | Greenfield | 99/199 X |
| 3,361,566 | 1/1968 | Axelrod | 99/3 |
| 3,420,933 | 1/1969 | Cords | 424/84 |
| 3,528,816 | 9/1970 | Nagae | 99/3 |
| 3,655,396 | 4/1972 | Goto et al. | 99/9 |

Primary Examiner—Wilbur L. Bascomb, Jr.
Assistant Examiner—Ernest G. Therkorn
Attorney, Agent, or Firm—Miketta, Glenny, Poms & Smith

[57] ABSTRACT

The bait utilized in the present invention is a fermented or decayed protein which has had all of the water removed therefrom. A method for making an attractive bait which includes fermenting proteins and removing the water therefrom by freeze drying or the addition of sorbtive material.

7 Claims, No Drawings

BAIT FOR SYNANTHROPIC FLIES AND METHOD FOR MAKING SAME

BACKGROUND OF THE INVENTION

Synanthropic flies such as the cyclorrhapha flies in the families Muscidae (e.g., the common house fly), Calliphoridae (e.g., the true and false screw worm flies) and Chloropidae (e.g., Hippelates eye gnats), Sarcophgidae (e.g., flesh flies) and Drosophilidae (fruit flies) are well known to be pests of man and other animals. Most of these flies are vectors of pathogenic organisms and are causal agents of certain pathological conditions in man and domestic and wild animals. Control and suppression of these insects, both for public health and economic reasons, are practiced all over the globe.

Due to the wide distribution and omnipresence of these flies, their diverse habits and vast breeding sources, control measures have to be administered incessantly. Some of the currently used measures involve application of residual insecticides to resting sites, breeding sources and release of space sprays or aerosols for short-term control. In general these treatments are made over the entire habitat in a given area and have broad spectrum activity against target as well as non-target arthropods. This type of treatment is very unsatisfactory because it is necessary to apply the insecticide over the entire area infested by the flies thereby making it uneconomical as well as potentially dangerous because of the large amounts necessary to control the flies. In the case of eye gnats and other flies, covering the total breeding and resting habitats would be impossible and, if possible, would be ecologically dangerous and economically unfeasible.

In view of the undesirability of distributing an insecticide over the area infested with such flies, some prior art workers have attempted to develop a bait containing an insecticide so that the flies would be attracted thereto thereby avoiding the necessity of having to distribute an insecticide over a large area. For the most part, the baits developed were liquid formulations. These liquid formulations are impractical to handle, apply, and difficult to transport. Moreover, the liquid formulations of which the inventors herein are aware, are ineffective because they lose their attractiveness as baits in a short period of time when sprayed onto surfaces.

Some dry baits have been developed but these are not attractive baits (i.e., will not attract the insect to the bait) but rather are contact baits. A contact bait is one which must actually contact the insect. After contact the insect will stay and feed. It is clear that such a bait is not useful for eye gnats, blow flies, fruit flies, etc., because these type of flies are widely distributed over a given area and do not generally land and explore substrates.

SUMMARY OF THE INVENTION

It has been found that synanthropic flies are attracted to various decaying and fermenting proteins when in the liquid or semi-liquid form. However, as noted above, when these liquid proteins are sprayed onto surfaces they lose their effectiveness and therefore their use has been limited to traps for assessing and detecting populations of these flies.

From the foregoing it is apparent that it is a desideratum in the art to disclose and provide a bait formulation which does not require coverage of the total surface or area where the target organisms breed, rest, fly or congregate. Moreover there is a tremendous need for dry or solid formulations of an attractive bait for control of these flies which will not lose its effectiveness when placed on a substrate.

It is therefore the primary object of the present invention to disclose and provide a dry formulation which can be mixed with an insecticide and which will attract synanthropic flies for a long period of time.

It is another object of the present invention to provide and embody a method for producing a dry or solid bait which will attract synanthropic flies.

A further object of the present invention is to disclose and provide a dry, fermented protein which is useful as a bait for attracting flies such as house flies, blow flies, fruit flies, ear wigs, ants and eye gnats.

Still another object of the present invention is to disclose and provide means and a method for selectively destroying synanthropic flies without affecting other arthropods in the same area.

A further object is to embody a dry bait of decayed proteins having trapped or contained therein a volatile attractant which will attract or lure flies.

Other objects of the present invention will be apparent from the following detailed description.

DESCRIPTION OF THE PREFERRED EMBODIMENT

The foregoing objects of the present invention are accomplished by forming a mixture or solution of protein and water, exposing the thus formed mixture or solution to air and allowing the mixture to stand in the presence of air until the mixture evolves obnoxious gases. At this point the mixture has the viscosity of a slurry. Thereafter, when the aging is completed the mixture can be frozen. In the frozen state, the mixture can remain almost indefinitely, because freezing prevents further decay of the protein and the volatile attractants cannot escape. Instead of freezing the fermented protein a material which will absorb water can be added in an amount sufficient to absorb substantially all the water (e.g., about 80 percent or 90 percent or more) in the fermented protein mixture so that water is not available or does not contact the protein material, thereby preventing further breakdown or decay of the protein. Moreover, the volatile attractants are also trapped in the sorbtive powder or granules.

If the mixture has been frozen and a fly bait is needed, the frozen mixture is freeze-dried by methods well known in the art. For example, the frozen mixture is placed into a drying chamber of a freeze-drying machine, and a vacuum is pulled on the chamber and substantially all of the water removed from the mixture. This freeze-drying method removes the water without substantially removing any of the attractants in the mixture which attract the flies. As a matter of fact, the freeze-dried mixture is much more attractive than the original protein material.

As noted above, freeze-drying methods are well known in the art and therefore no detailed exemplification thereof will be given; however, in the interest of clarity a short description will be given. In freeze-drying, the product being dried is kept in the frozen state at all times while the drying process is proceeding. In the present invention, the fermented protein composition can either be frozen before being placed in the drying chamber of the freeze-drying machine or be frozen in the drying chamber by lowering the temperature of the chamber to below the freezing temperature of the protein composition. It is generally preferred if the fermented protein composition is maintained at a temperature between 0°F. and 20°F. Before drying the frozen mixture, a high vacuum is pulled on the chamber. The precise amount of vacuum is dependent upon the temperature in the chamber during drying. The higher the vacuum the higher the temperature that can be utilized during the process and still have the product being dried remain frozen. For example, if a vacuum of 100 microns of mercury is utilized a drying temperature of 120°F. can be utilized during the process. If less vacuum is utilized (e.g., 1,000 microns) then the temperature utilized during the drying process has to be less (e.g., less than 100°F.) The lower the shelf temperature of the drying chamber the slower the drying or sublimating process. Therefore, it is normally desirable from an economic standpoint, to utilize a high vacuum and a correspondingly high temperature. The important point is that the protein composition being dried must be kept frozen during the drying process until substantially all of the water is removed therefrom.

The freeze-dried fermented protein can then be utilized to attract flies by placing it in the desired location. It is usually desirable to mix an insecticide for the flies with the thus-produced bait. The flies are attracted to the bait material and are then killed by the insecticide.

The type of protein which can be utilized in the present invention can be soluble or insoluble in water. As is well known, proteins occur in living matter, primarily in animals. However, proteins do occur in vegetable material. For example, proteins are essential constituents of all plant tissues and they occur in rather large quantities in the seeds and fruits of plants, as well as various fungi. Examples of vegetable products having a high protein content are nuts, wheat, corn, oats, beans, peas, mushrooms, and yeast. However, in general, we have found that animal proteins are excellent as sources for the attractant of the present invention. Animal proteins useful are whole egg solids, fresh eggs, and fish meal.

Generally speaking, proteins which can be utilized to good effect in the present invention are simple proteins such as the albumins (e.g., egg albumin and serum albumin), globulins (e.g., edestin of hemp seed and serum globulin); glutelins prolamins and protamines; congregated proteins useful in the present invention such as nucleo proteins (proteins combined with nucleic acid) and phosphoproteins (e.g., casein of milk); and derived proteins such as proteoses and coagulated proteins (insoluble proteins caused by the action of heat or alcohol.

In order to produce the attractive fly bait of the present invention it is necessary to ferment or break down these proteins with production of gas. Water must be added to the proteins because dry proteins will not ferment or decay with production of attractive gas. The amount of water added to the protein is not critical but we have found that good results are obtained if from 20 percent to 95 percent, by weight, of water is added to the protein material. Generally, it is preferred if more than 50 percent of the solution or mixture is water, e.g., from 60 percent to 80 percent or 90 percent, by weight, is water.

The fermentation or putrefaction takes place by merely allowing the protein-water mixture to contact air at room temperature. Microorganisms or bacteria contained in the air cause the fermentation or decay of the protein in the presence of air. In any event, we have discovered that if the mixture of protein and water contains microorganisms from the air and is allowed to stand for a period of time an obnoxious gas will be formed which indicates that fermentation or decay is taking place. At some time when the gas is being produced it is important to either freeze the mixture or remove the water by adding a sorbtive material.

The temperature at which the fermentation, decay or putrefaction takes place is not particularly important, except that it must be above the freezing point of the mixture and below the boiling point thereof. For fast production of attractants, it is preferred that the temperature range be between 80°F. and 100°F. It has been found that this is the most desirable temperature for decay or putrefaction of the protein by microorganisms or bacteria.

The aging process (i.e., the putrefaction process) is completed within 14 days (e.g., 1 or 2 to 14 days) depending upon the particular protein utilized and the particular temperature utilized. As aforesaid, the only criticality in the length of time the putrefaction process is allowed to take place, is in the production of the attractant from the protein-water mixture. The mixture must be frozen or the attractant removed by distillation or addition of sorbtive powder when the maximum quantity of attractant is produced.

After the aging process is completed the mixture is frozen and freeze-dried by methods known in the art.

From the foregoing description it can be seen that the process for preparing the freeze-dried bait involves (1) allowing a protein-water mixture or solution to putrify or ferment in the presence of bacteria or microorganisms contained in the air until the production of attractants, (2) sometime while the attractant is still being produced the protein-water mixture is frozen, and (3) the frozen protein product is freeze-dried to remove substantially all of the water. It is, of course, preferred to freeze the fermenting product when the maximum amount of attractant is produced. The resulting freeze-dried product can be kept for long periods of time.

The preferred protein utilized to produce the bait of the present invention is whole egg powder since it is very inexpensive. However, it is again emphasized that, insofar as we are aware, any protein material can be utilized and, specifically, the proteins which we have utilized successfully are partially hydrolized yeast, fresh eggs, autolyzed yeast, albumin, and fish meal.

To produce the freeze-dried bait of the present invention 6 parts by weight of dried powdered whole egg is blended with 15 parts by weight of water in a blender. The resulting mixture is a very thick viscous product. The resulting mixture of egg and water is transferred to a container having an open top for aging.

Aging takes place in a room with the temperature maintained at about 90° to 95°F. As aging continues, the mixture is stirred every 2 or 3 days. The aging process is completed in 7–14 days. The aging process turns the egg-water mixture into a flowable slurry, from which is produced a gas having a disagreeable odor. The slurry contains most of the attractant.

If the product is freeze-dried, the mixture is poured into trays and frozen solid. The freezing of the mixture can be done in either the drying chamber of a freeze-dryer or in any other convenient manner. When frozen solid, the mixture is ready for the freeze-drying process. Once frozen the mixture can be kept frozen indefinitely without loss of activity.

The equipment used for freeze-drying the aged egg mixture is Thermovac Model No. 102F. The frozen egg mixture is placed in the drying chamber of the machine. The vacuum pump is started and a vacuum pulled on the drying chamber of the freeze-drying machine until a vacuum of 50–100 microns of mercury is obtained. The temperature in the drying chamber is maintained at about 100° to 120°F. Eight to 10 hours of continuous operation returns the putrified protein-water composition to a dry-solid state, however, it is much more attractive to flies than the original powdered egg. During the entire freeze-dry operation the putrified protein-water composition is in the frozen state. When the temperature of the protein composition reaches 40° to 50° the protein is completely dried and, as noted above, this occurs in about 8 to 10 hours with the machine utilized.

In order to compare the freeze-dried bait with a bait prepared in the identical manner except instead of freeze drying the fermented egg-water composition was spray dried. The results of the test are shown in the following table:

TABLE I

| Sample No. | Inlet Temp. °F. | Outlet Temp. °F. | Avg. No. gnats/cup | % of Total gnats/caught |
|---|---|---|---|---|
| | | Test I | | |
| Spray-dried 1 | 420 | 203–221 | 49 | 11 |
| Spray-dried 2 | 300 | 150–167 | 22 | 5 |
| Spray-dried 3 | 250 | 167–176 | 22 | 5 |
| Freeze-dried | — | — | 347 | 79 |
| | | Test II | | |
| Spray-dried 1 | 420 | 203–221 | 20* | 7 |
| Spray-dried 2 | 300 | 150–167 | 33* | 12 |
| Spray-dried 3 | 250 | 167–176 | 15* | 6 |
| Freeze-dried | — | — | 249* | 75 |
| | | Test III | | |
| Spray-dried 1 | 420 | 203–210 | 14 | 5 |
| Spray-dried 2 | 300 | 150–167 | 61 | 21 |
| Spray-dried 3 | 250 | 176 | 55 | 19 |
| Freeze-dried | — | — | 160 | 55 |

In the above table each cup contained 200 grams of sand and 50 grams of water, with 0.4 grams of the bait placed upon the sand. The cups were open to the air. Six hours before testing 1 percent of dimethyl-2,2-dichlorovinylphosphate, an insecticide, was added. Each of the cups were placed on a turntable located near Mecca, Calif. In Test I and III the results are the average of three repetitions whereas Test II (noted with a star) was based on two repetitions. The results of the test were based upon the number of gnats found in each cup.

As is apparent, the freeze-dried bait was at least 250 percent more effective in attracting eye gnats to almost 12 times more effective.

Two more batches of protein bait (whole egg) were made by spray drying one batch wherein the inlet temperature was 360°F. and the outlet temperature was 150°F. and the other batch was made by spray drying wherein the inlet temperature was 430°F. and the outlet temperature was 200°F. It was found that initially the freeze-dried bait was about 6½ times more effective than the spray dried bait. 24 hours later the freeze-dried bait was 5 times more attractive than the spray-dried bait. At 48 hours the freeze-dried bait was 17 times more attractive than the spray-dried bait.

The amount of bait utilized in the field is not critical, the precise amount and how far apart the bait is placed is dependent upon the number of insects in the particular area. It has been found that 5 to 10 grams of bait (containing 50 percent by weight of a diluent such as sugar or blood meal and about 0.1 percent of dimethyl-2, 2-dichlorovinyl phosphate, DDVP) is placed in piles on damp ground in agricultured fields (about 3 to 5 piles per acre) eye gnats, etc., are easily controlled. The bait should be replaced every 3 to 5 days for best results.

If the bait of this invention is utilized to control house flies in poultry houses then 15 to 20 piles of the bait are utilized for normal size poultry houses containing 5,000 to 10,000 birds.

We have also discovered that a certain amount of moisture to attract eye gnats and blow flies (but not house flies) should be available in the surroundings of the bait. If the relative humidity is above about 50 percent (preferably 80 percent) this is sufficient to make the bait very attractive. If the relative humidity is not that high then the bait should be placed on a damp, porous substrate such as soil so that water is available for the bait. For example, if the ground is moist, (i.e., contains at least 5 percent of water, preferably at least 10 or 15 percent by weight of water) the bait is very attractive even under low humidity conditions.

It has been found that when the bait of this invention is utilized under low relative humidity conditions (from 5 percent to 10 percent) and it is desired that eye gnats and blow flies be attracted thereto, it is desirable if the substrate has 5 percent moisture, and preferably 10 percent or more. For example, in one test it was found that under low relative humidity conditions (5 percent to 19 percent) the number of eye gnats caught varied with the amount of moisture in the substrate. For example, when the substrate had 5 percent moisture the number of eye gnats caught was 14, when the substrate had 10 percent the number of eye gnats caught was 38, when the substrate had 20 percent moisture the number of eye gnats caught was 128, and when the substrate had 25 percent moisture the number of eye gnats caught was 170.

In order to control flies (including eye gnats, ear wigs and ants) the bait of this invention must have added thereto an insecticide because the bait per se will not kill flies. We have found that the addition of insecticides to the attractive fly bait of the present invention have little or no effect on the efficacy of the fly bait of this invention to attract flies. Similarly, the amount of insecticide added to the fly bait apparently has no effect on the fly bait's efficacy. However, from an economic standpoint as little insecticide as possible should be added to the fly bait providing, of course, that the amount is sufficient to kill the particular insect (e.g., fly, ant, gnat or ear wig). Generally speaking, the amount of insecticide added to the attractive bait will range from as little as 0.05 percent to as high as 5 percent or more with the preferred amount being between 0.5 percent to 1 percent or 2 percent, by weight, depending upon the particular insecticide and particular insects desired to be controlled.

The type of insecticides utilized are quite varied and include the insecticide mentioned above, i.e., DDVP. However, other insecticides can be utilized such as Isolan (1-isopropyl-3-methyl-5-pyrazolyl dimethylcarbamate), trichlorfon, dieldrin naled and chlordane.

In order to make the attractive bait of the present invention more economical to use it is often times desirable to add a diluent such as sugar or blood meal. Neither of these diluents have any effect on the attractiveness of the bait of the present invention; however, since both are less expensive than the bait it is desirable to use them because less attractive bait is necessary to obtain equivalent results. For example, if sugar is utilized, it can be added in amounts of 80 percent or less, preferably 50 percent or less by weight. If sugar is added in an amount of 50 percent by weight to the bait of this invention, the amount of bait utilized can be reduced by about half.

In the previous description, the effects of a freeze-dried bait were shown. However, as has been noted, the present invention also contemplates decaying the protein in the manner indicated above, and after the protein has been decayed or fermented, adding thereto a sorbtive material in an amount sufficient to totally absorb the water. Such a bait has all of the desirable attributes as the freeze-dried bait and the same additives, insecticides, etc., may be added thereto and in the same amounts. When the sorbtive material is added to the water the attractant is absorbed by the sorbtive material and is trapped and can be kept indefinitely in a sealed container.

The sorbtive material utilized in the present invention can be any of a number of well-sorbtive materials including any of the hydratable clays or minerals. Hydratable minerals and clay which have been utilized to good effect are vermiculite, montmorillonite clay (e.g., sodium bentonite, sub-bentonites, and hectorite) attapulgite and diatomaceous earth. Other materials contemplated include common sawdust.

The amount of sorbtive material added to the putrified or decayed protein-water composition, depends upon the sorbtiveness of the material and the amount of water in the protein-water composition. There are no set amounts since the purpose of adding the sorbtive material is to absorb all the water so that one will end up with a dry material in which substantially no free water contacts the protein. However, it is generally found that from 10 to 40 percent by weight of the sorbtive material may be added to the protein-water composition and, more preferably, from 20 to 30 percent, by weight. It is preferred if the sorbtive material is in the form of granules or powder.

The sorbtive bait is utilized in exactly the same manner as the freeze-dried bait. That is, an insecticide can be added thereto and if, under conditions of low relative humidity, the sorbtive bait should be placed on a damp substrate.

In the foregoing description of the invention all parts are by weight, unless stated, all percentages are by weight unless otherwise stated, and all temperatures are given in Farenheit. It should also be noted that when percentages are given they are based upon the entire weight of the composition.

In the foregoing description certain specific proteins were exemplified but it should be noted that any protein which can be broken down or putrified by microorganisms contained in the air can be utilized provided that the putrefaction takes place with the evolution of an obnoxious gas. Additionally, certain temperatures, vacuums, and amounts were exemplified; however, such exemplification was for the purpose of more clearly understanding the invention and are not to be considered as limiting.

It should also be noted, that fermented protein-water-attractant mixture can be distilled and sorbtive powder added to the distillate. The distillation is easily accomplished by boiling the fermented mixture and condensing the vapors. The sorbtive material is then added to the thus obtained distillate in an amount sufficient to form a dry composition. The resulting dry bait can be utilized as set forth above.

We claim:

1. A method for attracting synanthropic flies and ants which comprises placing a solid and dry bait on a substrate in contact with the air and in an environment having an available moisture content of at least 10 percent by weight and leaving said bait on said substrate and in contact with said air and said environment whereby there is evolution of a gas attractant which is attractive to synanthropic flies and ants, said bait consisting essentially of a dry solid fermented protein composition from which substantially all of the water was removed while said composition was frozen, said freezing taking place when said protein was evolving an attractant gas.

2. A method according to claim 1 wherein the protein composition is selected from the group consisting of whole egg powder, yeast, fresh eggs, and albumin.

3. A method according to claim 1 wherein the bait is placed on a porous substrate containing at least 10 percent by weight of moisture.

4. A method for attracting synanthropic flies and ants which comprises placing a solid attractive bait on a substrate in contact with the air and in an environment having an available moisture content of at least 10 percent by weight and leaving said bait on said substrate and in contact with said air and said environment whereby there is evolution of a gas attractant which is attractive to synanthropic flies and ants, said bait consisting essentially of water, decayed protein, and sorbtive material, said sorbtive material having substantially all of the said water absorbed therein and not available to the protein, said water being absorbed while said protein was evolving an attractant gas.

5. A method according to claim 4 wherein the sorbtive material is a member selected from the group consisting of hydratable clay and mineral.

6. A method according to claim 4 wherein the amount of water present is from 50 to 80 percent, by weight, based on the weight of the protein and water.

7. A method according to claim 6 where the amount of sorbtive material present is between 10 and 40 percent, by weight, based on the entire composition.

* * * * *